(12) United States Patent
Katagiri et al.

(10) Patent No.: US 6,554,261 B2
(45) Date of Patent: Apr. 29, 2003

(54) HUMIDIFIER

(75) Inventors: Toshikatsu Katagiri, Saitama (JP); Yoshio Kusano, Saitama (JP); Hiroshi Shimanuki, Saitami (JP); Motohiro Suzuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/764,430

(22) Filed: Jan. 19, 2001

(65) Prior Publication Data

US 2001/0015501 A1 Aug. 23, 2001

(30) Foreign Application Priority Data

Jan. 19, 2000 (JP) ........................................ 2000-010975
Jan. 31, 2000 (JP) ........................................ 2000-023220

(51) Int. Cl.⁷ .................................................. B01F 3/04
(52) U.S. Cl. ........................ 261/154; 261/156; 261/104; 96/8
(58) Field of Search ................................ 261/104, 142, 261/154, 156; 96/8; 95/52; 128/201.13

(56) References Cited

U.S. PATENT DOCUMENTS 2,610,038 A * 9/1952 Phillips ........................ 261/104
6,471,195 B2 * 10/2002 Shimanuki et al. ............ 261/44.1
2001/0009306 A1 * 7/2001 Shimanuki et al. ........... 261/104
2001/0015500 A1 * 8/2001 Shimanuki et al. ........... 261/104

FOREIGN PATENT DOCUMENTS

| JP | 2-70719 | 5/1990 |
|----|---------|--------|
| JP | 5-8830 | 2/1993 |
| JP | 5-33975 | 2/1993 |
| JP | 6-11160 | 1/1994 |
| JP | 6-132038 | 5/1994 |
| JP | 7-55210 | 3/1995 |
| JP | 7-71795 | 3/1995 |
| JP | 7-245116 | 9/1995 |
| JP | 8-273687 | 10/1996 |
| JP | 10-74532 | 3/1998 |
| JP | 11-51427 | 2/1999 |
| JP | 11-300141 | 11/1999 |

* cited by examiner

Primary Examiner—C. Scott Bushey
(74) Attorney, Agent, or Firm—Arent Fox Kintner Plotkin & Kahn, PLLC

(57) ABSTRACT

A humidifier includes a housing that accommodates bundles of a large number of water permeable hollow fiber membranes arranged along the longitudinal direction of the housing. Two different gasses having different moisture contents pass through outside and inside of the bundle of the hollow fiber membranes separately to exchange their moistures through the hollow fiber membranes resulting in the dry gas of lesser moisture content being humidified. A heating or temperature adjuster is provided to maintain the temperature of the exhaust gas introduced to the humidifier or the bundles of hollow fiber membranes substantially at a temperature of a fuel cell in operation.

5 Claims, 13 Drawing Sheets

X-X CROSS-SECTION

Y-Y CROSS-SECTION

HUMIDIFIER

BACKGROUND OF THE INVENTION

1. Field of the Invention

The present invention relates to a humidifier. Particularly, the present invention relates to a humidifier having a water permeable hollow fiber membrane, wherein a fuel cell system equipped with this humidifier can be used in colder territory.

2. Prior Art

There have been used a fuel cell of solid macromolecular type. In recent years, the fuel cell equipped with a humidifier which has good water permeability is mostly applied as a power source for automobiles. Moisture included in exhaust gas (off gas) discharged from the fuel cell is transmitted to dry air through the humidifier. It is preferable to apply a fuel cell of less electric power consumption. It is also desired that a humidifier require less installation space. In other words, a compact humidifier is required. For this reason, the humidifier with a hollow fiber membrane is mostly used for the fuel cell apart from ultrasonic humidifier, steam humidifier, evaporation humidifier, nozzle injection humidifier, etc.

A conventional humidifier with a hollow fiber membrane is disclosed in Japanese Laid-open Patent Publication No.HEI 7-71795. As shown in FIG. 1, a humidifier 100 comprises a housing 101, on which a first inlet 102 for introducing dry air and a first outlet 103 for discharging the dry air (humidified dry air) are provided. A bundle of hollow fiber membranes 104 consisting of a number of hollow fiber membranes (for example 5000) is accommodated within the housing 101.

At both ends of the housing 101, fastening members 105, 105' are provided for fixing the ends of the bundle 104 while leaving them open. Outside of the fastening member 105 is provided a second inlet 106 for introducing moist air or moist gas, and a second outlet 107 is provided outside of the fastening member 105' for discharging the moist air, moisture of which is separated and removed from the bundle of hollow fiber membranes 104. The fastening members 105, 105' are covered with a first head cover 108 and a second head cover 109, respectively. And the second inlet 106 is formed on the first head cover 108, while the second outlet 107 is formed on the second head cover 109.

In the aforementioned humidifier 100 utilizing hollow fiber membranes, the moist air introduced from the second inlet 106 passes through the hollow fiber membranes forming the bundle of hollow fiber membranes 104, and the moisture within the moist air is separated by capillary action of the hollow fiber membranes. The separated moisture moves outward of the hollow fiber membrane through a capillary tube of the membrane. The moisture in the air is discharged from the second outlet 107.

In the meantime, dry air is supplied from the first inlet 102. The dry air from the first inlet 102 flows outside of the hollow fiber membranes forming the bundle of hollow fiber membranes. Because the moisture separated from the moist air has moved outside of the hollow fiber membranes, the moisture humidifies the dry air. The humidified dry air is then discharged from the first outlet 103.

However, as stated above, the humidifier 100 applying conventional hollow fiber membranes often become frozen in colder environments. When the bundle of hollow fiber having water permeability and located in the hollow fiber membrane module is frozen in colder environments, the operator is forced to wait until the frozen bundle of hollow fiber is naturally defrosted by warmed atmosphere. Accordingly, the humidifier 100 is for some time prevented from being in normal operating condition.

SUMMARY OF THE INVENTION

The present invention has been made with the foregoing background in mind. The object of the present invention is to offer a humidifier consisting of a housing accommodating a large number of water permeable hollow fiber membranes arranged along a longitudinal direction of the housing. Two different gasses having different moisture contents pass through outside and inside of the bundle of the hollow fiber membranes separately. The different two gasses exchange their moistures through the hollow fiber membranes and the dry gas of less moisture content is thus humidified. A bundle of water permeable hollow fiber membranes is accommodated in the housing along longitudinal direction of said housing. The present invention is further characterized in that said humidifier is provided with a heating means to supply heat to the bundle of said hollow fiber membranes.

By applying such a heating means to supply heat to said bundle of hollow fiber membranes, the humidifier can be used even in colder environments by defrosting the frozen bundle of hollow fiber membranes without any care.

DETAILED EXPLANATION OF THE PREFERRED EMBODIMENTS OF THE INVENTION

Now an example of the humidifier according to the present invention is explained with reference to the accompanying drawings.

Figure 1:
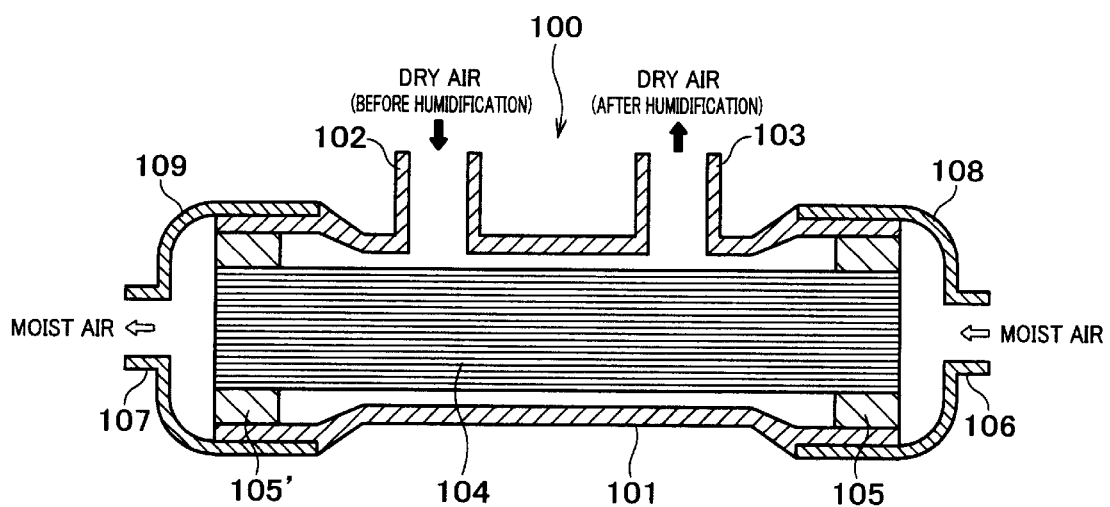
FIG. 1 is a cross section indicating a conventional humidifier.
Figure 2:
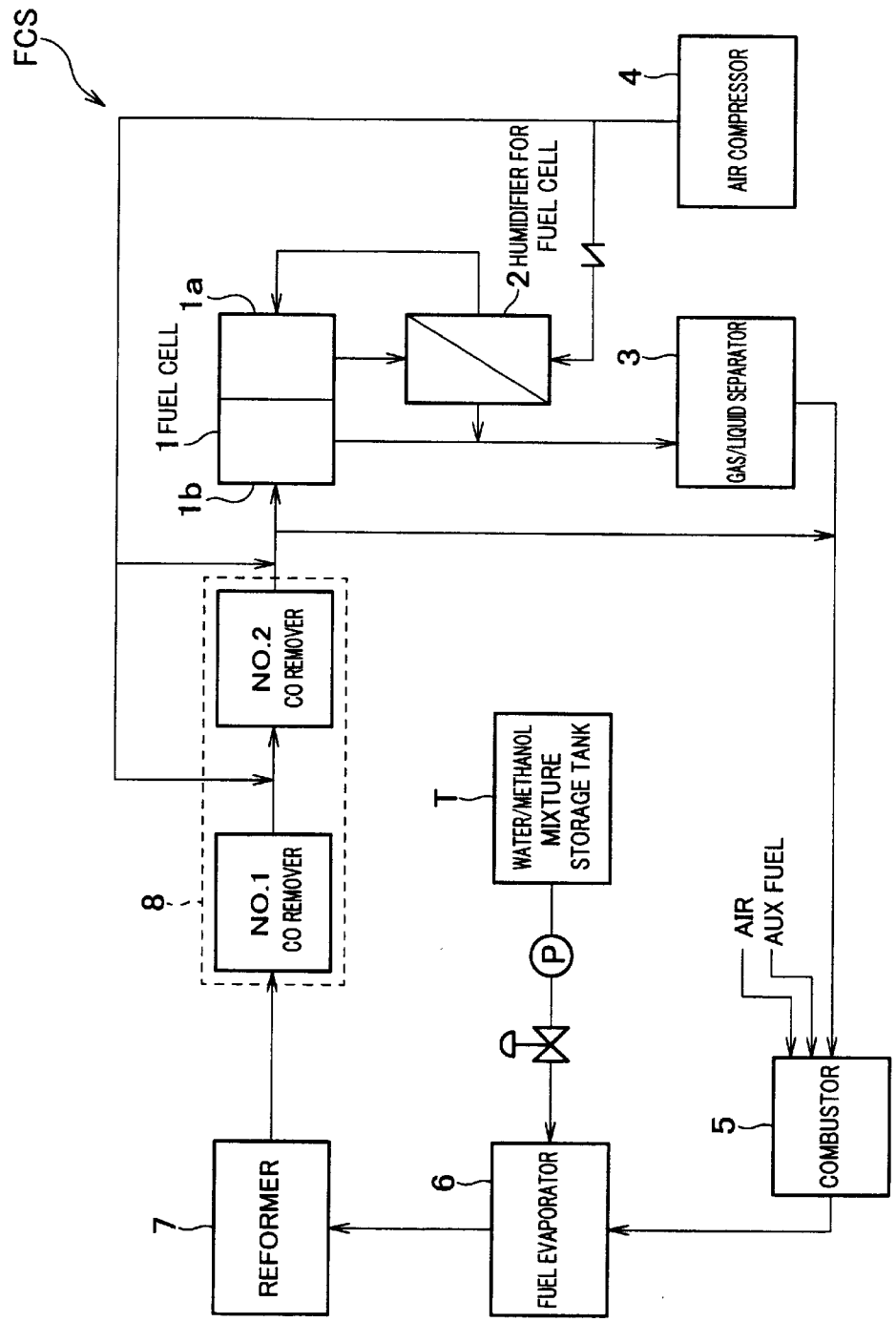
FIG. 2 is a block diagram indicating the overall composition of the fuel cell system to which the humidifier according to the present invention is equipped.
Figure 3:
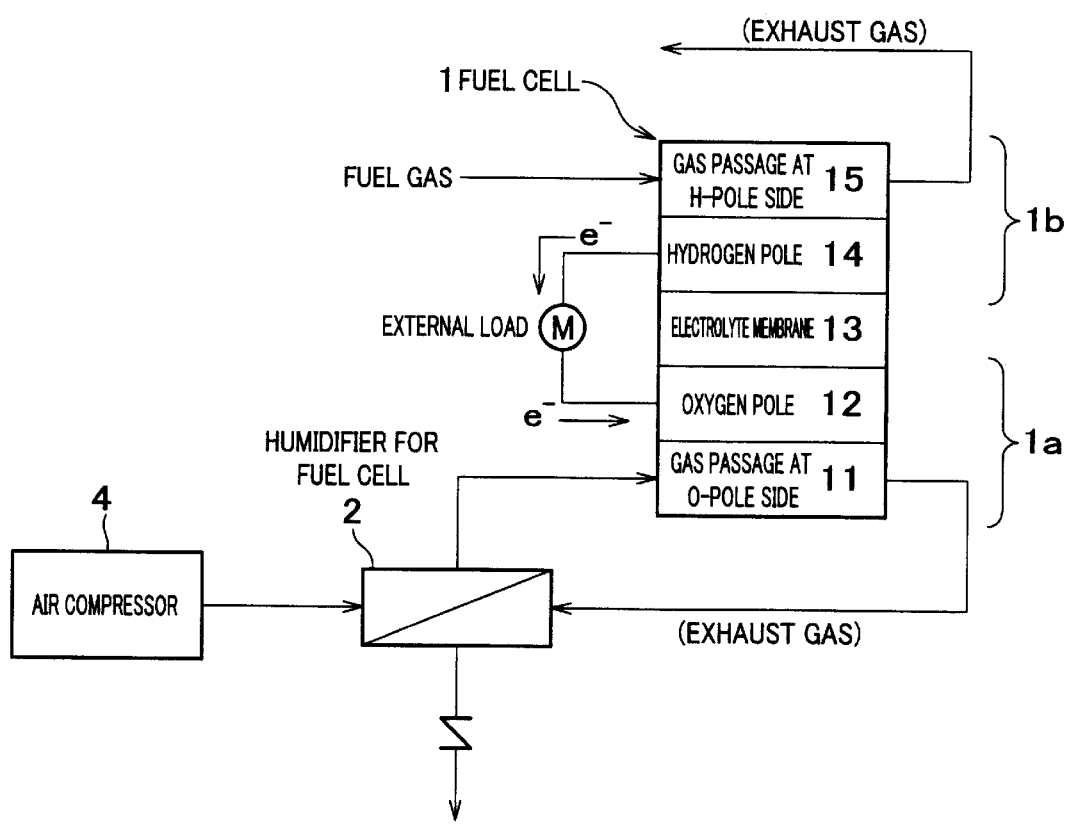
FIG. 3 is a block diagram illustrating the overall composition of the fuel cell system which is humidified by the humidifier according to the present invention.

FIG. 2 is a block diagram indicating the overall composition of the fuel cell system. FIG. 3 is a block diagram explaining the overall construction of the fuel cell system. FIG. 4 is a perspective view indicating the overall construction of the fuel cell system. FIG. 5 is a cross section indicating flow of gasses in the humidifier.

FIG. 2 illustrates the overall construction and function of the fuel cell system according to the embodiments of the present invention.

The fuel cell system (hereinafter and in the drawings referred to as only FCS) comprises a fuel cell 1, a humidifier 2, a gas/liquid separator, an air compressor 4, a combustor 5, a fuel evaporator 6, a reformer 7, a CO remover 8 and a storage tank for the mixture of water and methanol (hereinafter referred to only as tank). The fuel cell 1 is of a solid macromolecular type.

In the fuel cell 1, humidified air as an oxidant gas is supplied to an oxygen pole side 1a and hydrogen-enriched gas as a fuel gas is supplied to a hydrogen pole side 1b. The fuel cell 1 takes an electric energy from the chemical energy brought about due to the chemical reaction between oxygen and hydrogen to generate a power. The humidified air is brought about by compressing atmospheric air (air), which is compressed by the air compressor 4, and then humidifying said compressed air in the humidifier 2. The humidification of the dry air is carried out through the moisture-exchange between the exhaust gas which contains relatively larger amounts of moisture discharged out of the oxygen pole 1a and the dry air which has a relatively smaller moisture content, details of which will be described later on. The fuel gas is generated when the mixture of water and methanol, which is a raw fuel liquid, is evaporated in the fuel evaporator 6, and reformed in the reformer 7, followed by the removal of carbon monoxide (CO) in the CO remover 8. The raw fuel liquid stored in the tank T is metered through a pump P to the fuel evaporator 6 at which the liquid fuel is evaporated and mixed with air for the reformation to provide a raw fuel gas, the resulting raw fuel gas is supplied to the reformer 7, and then to the CO remover 8 at which CO is removed. In the reformer 7, methanol is steam-reformed and partially oxidized in the presence of a catalyst. In the CO remover 8, CO is selectively oxidized in the presence of a catalyst to be converted into $CO_2$. In order to quickly decrease the concentration of carbon monoxide, the CO remover is composed of two CO removers, i.e., No. 1 CO remover and No. 2 CO remover. The air compressor 4 supplies air for the selective oxidation to the CO remover 8.

The exhaust gas containing a large amount of water produced at the oxygen pole side 1a and the exhaust gas containing remained hydrogen at the hydrogen pole side 1b occur at the same time. The exhaust gas at the oxygen pole side 1a is used for the humidification of the air in the humidifier 2 as aforementioned, after which it is mixed with the exhaust gas from the hydrogen pole side 1b, and the water contained therein is removed through the gas/liquid separator 3. Consequently, the exhaust gas from which the water is removed (mixed exhaust gas) is combusted in the combustor 5, and is used as a heat source for the fuel evaporator 6. It is noted that an auxiliary fuel (methanol etc.) and air are supplied to the combustor 5 in order to supply a deficient calorie and to warm up the fuel cell system FCS when it is started.

The configuration and function of the fuel cell will now be described by referring to FIG. 3. In FIG. 3, the fuel cell 1 is expressed as a single cell in order to simplify the configuration. (Actually, the fuel cell 1 is configured as a laminate having approximately 200 single cells laminated).

As shown in FIG. 3, the fuel cell 1 is divided into the hydrogen pole side 1b and the oxygen pole side 1a across an electrolyte membrane 13, and each of the poles has an electrode containing a platinum series catalyst to form a hydrogen pole 14 and an oxygen pole 12. The hydrogen-enriched gas occurring from the raw fuel liquid is passed through a gas passage 15 at the hydrogen pole side as the fuel gas, while the humidified air humidified in the humidifier 2 is passed through a gas passage 15 at the oxygen pole side as the oxidant gas. As electrolyte membrane 13 which can be used herein, a solid macromolecule membrane, such as perfluorocarbon sulfonic acid, which is a proton-exchange membrane, has been known. The electrolyte membrane 13 has a plurality of proton-exchanging groups in the solid macromolecule, and has a low specific resistance lower than 20 Ω-proton at a normal temperature, when being saturated with water, serving as a proton-conductive electrolyte. Consequently, the protons produced by the ionization of hydrogen in the presence of the catalyst are easily migrated in the electrolyte membrane 13, and reach the oxygen pole 13, at which the protons are readily reacted with the oxygen ions produced from the humidified air in the presence of the catalyst to produce water. The produced water is discharged from an outlet residing at the oxygen pole side 1a of the fuel cell 1 as a moist exhaust gas together with humidified air. At the time of the ionization of hydrogen, electrons $e^-$ are produced in the hydrogen pole 14. The produced electrons $e^-$ reach the oxygen pole 12 via an external load M such as a motor.

The reason why the humidified air is supplied to the fuel cell 1 as an oxidant gas is that power generation efficiency is decreased due to the lowered proton conductivity in the electrolyte membrane 13 if the electrolyte membrane 13 is dried. Consequently, in the fuel cell system FCS utilizing the solid macromolecular type fuel cell 1, the humidification is of important consequence. The raw fuel liquid comprising a mixture of water and methanol contains a large amount of water, which is used for the purpose of humidifying the fuel gas. But if the raw fuel liquid should not contain a required amount of water for humidifying the raw fuel gas, the humidifier 2 according to the present invention is desirably applied.

The configuration and function of the humidifier 2 will be described with reference to FIG. 4 and FIG. 5.

Figure 4A:
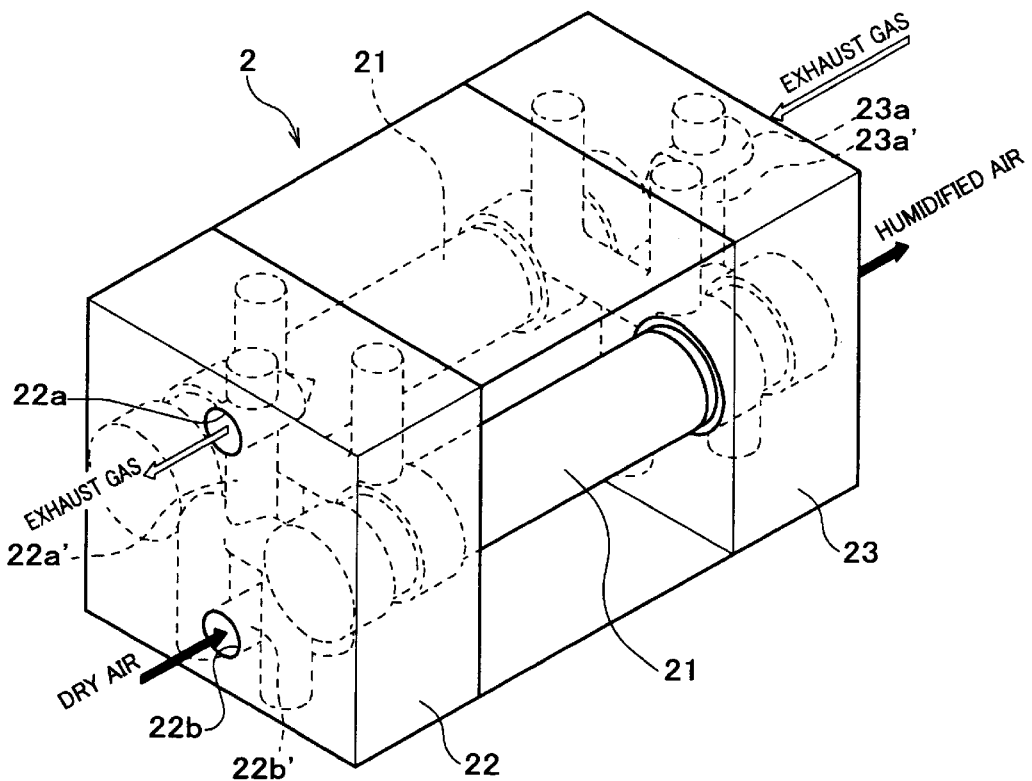
FIG. 4A is a perspective view indicating the overall composition of the humidifier according to the present invention.
Figure 5A:
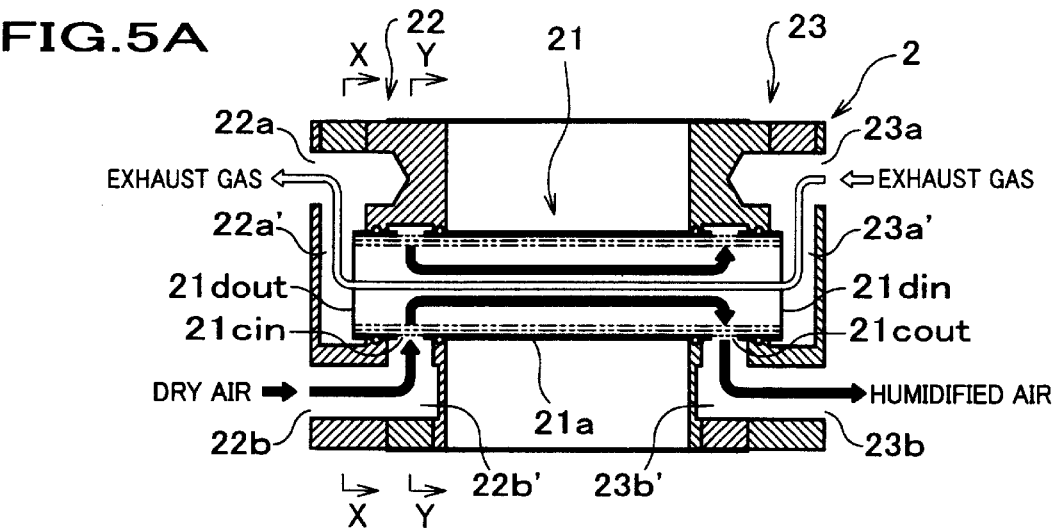
FIG. 5A is a cross section indicating a flow of gasses within the humidifier according to the present invention.
Figure 5B:
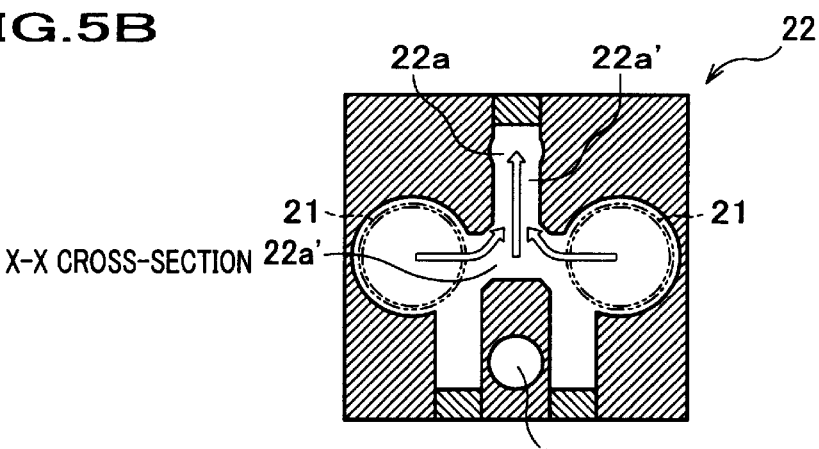
FIG. 5B is a cross section taken along X—X line of FIG. 5A.
Figure 5C:
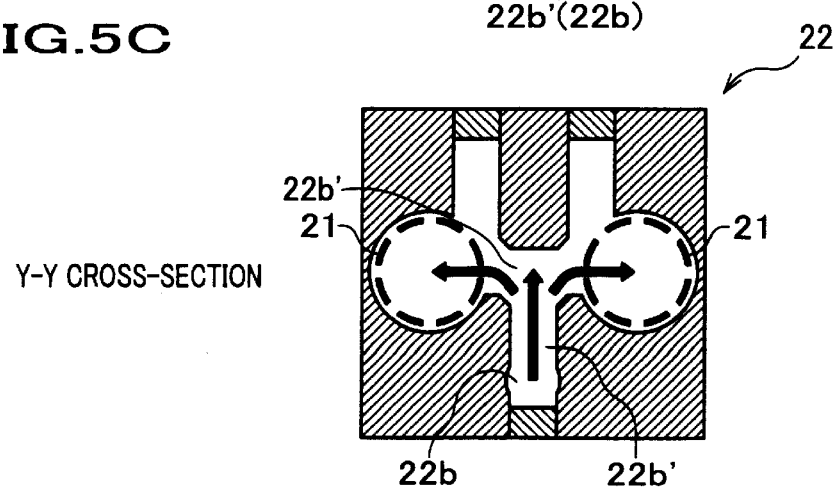
FIG. 5C is a cross section taken along Y—Y line of FIG. 5A.

As shown in FIG. 4A, the humidifier contains two modules of approximately cylindrical structure type. Two modules are arranged in parallel to each other. The humidifier further includes a housing, one end of which is provided with a distributor 22 and the other end of which is provided with another distributor 23. The overall configuration of the humidifier 2 is a rectangular parallelepiped. Two modules of hollow fiber membranes 21, 21 are fixedly secured by means of the distributor 22 located at one end of the housing and the distributor 23 located at the other end of the housing on a same level with a predetermined distance in parallel. The dry air is supplied to and the exhaust gas is discharged from the distributor 22. While, the humidified air is discharged from and the exhaust gas is supplied to the distributor 23.

Figure 4B:
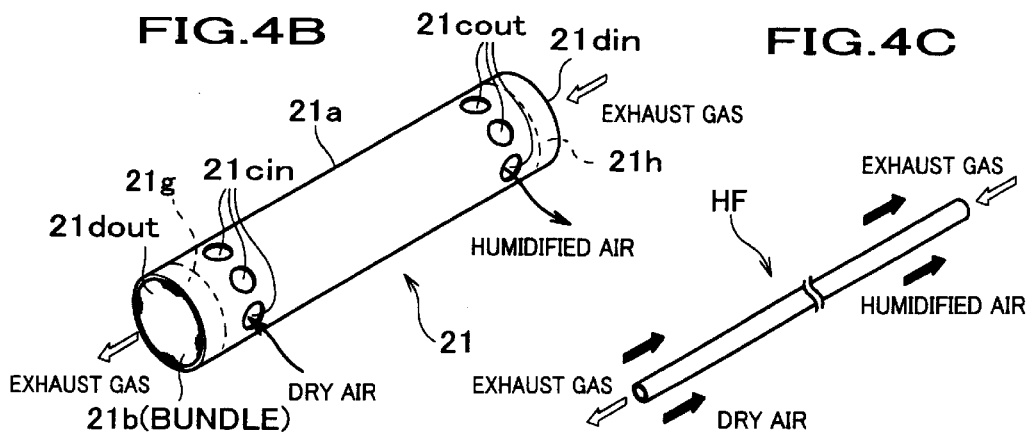
FIG. 4B is a perspective view of a module of the hollow fiber membranes according to the present invention.
Figure 4C:
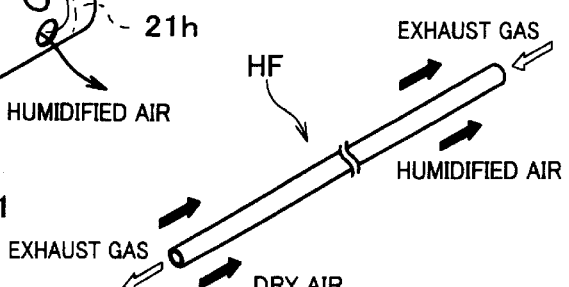
FIG. 4C is an enlarged view of the hollow fiber membranes according to the present invention.

As shown in FIG. 4B, the hollow fiber membranes module 21 comprises a housing 21a and a bundle of the hollow fiber membranes 21b accommodated in the housing 21a. The housing 21a is a hollow cylindrical tube, both ends of which are left open. The housing 21a is provided with a plurality of apertures (about eight pieces along the circumferential direction at each end) located near each end. The bundle of the hollow fiber membranes 21b accommodated in the housing 21a comprises a bundle of hollow fiber including several thousands hollow fiber membranes HF (hereinafter referred to only as HF) as shown in FIG. 4C. Both ends of the HF are fixed with an adhesive, respectively, so that the hollow passages of the hollow fiber membranes at each end may keep said hollow passages in normal flowing condition. The parts where the HF 21b is fixedly secured to the hosing 21a with the adhesive at both ends are called as potting parts 21g, 21h. The exhaust gas passing through inside of the hollow passage of the HF 21b and the humidified dry air passing through outside of the hollow passage of the HF 21b are strictly prohibited from being mixed. At one end of the housing 21a one end of the hollow fiber membranes module 21 is utilized as a discharge aperture 21dout of the exhaust gas and the other end is utilized as a supply aperture 21din of the exhaust gas. Meanwhile, the aperture along the circumferential direction at one end of the housing 21a is utilized as a dry air inlet 21cin and the other aperture along the circumferential direction at the other end of the housing 21a is utilized as a humidified air outlet 21cout. Such a module of the hollow fiber membranes 21 is prepared such that a predetermined number of hollow fiber membranes are placed in the housing 21a keeping both ends of each HF at each end of the housing 21a to fix the end of the HF to the end of the housing 21a with adhesive and cut out the bundle of the HF along the end wall of the housing 21a.

The heating means to supply a necessary heating calorie to the bundle of the hollow fiber membranes, accommodated in the housing 21a of the module 21, is explained later on.

The distributor 22 as well as the other distributor 23 fix the two modules of the hollow fiber membranes 21, 21 between the two distributors with the predetermined distance in parallel. The distributor 22 has the exhaust gas outlet 22a and the dry air inlet 22b. The exhaust gas outlet 22a and the exhaust gas outlet 21dout of each module of the hollow fiber membranes 21 are communicated in an internal passage 22a' located within the distributor 22 (refer to FIG. 5A, 5B). Likewise, the dry air inlet 22b and the dry air inlet 21c of each module of the hollow fiber membranes 21 are communicated in an internal passage 22b' located within the distributor 22 (refer to FIGS. 5A, 5B).

Meanwhile, the distributor 23 located at the other end of the module 21 is provided with the exhaust gas inlet 23a and the humidified air outlet 23b. The exhaust gas inlet 23a and the exhaust gas inlet 21din of each module of hollow fiber membranes 21 are communicated in the inside flow passage 23a' located within the distributor 23 at the other end (refer to FIG. 5A). Likewise, the humidified air outlet 23b and the humidified air outlet 21cout are communicated in an internal passage 23b' located within the distributor 23 (refer to FIG. 5A).

The hollow fiber membrane HF applied in the module of the hollow fiber membranes is a hollow fiber of a degree of between 300 micrometer and 700 micrometer in inside diameter as shown in FIG. 4C. Due to the fineness of the hollow fiber membrane in diameter, it is characterized in that the packing density per hollow fiber membrane module is larger. The hollow fiber membrane HF has an excellent durability to high pressure. The moisture is separated through the hollow fiber membrane such that the exhaust gas is passed through inside of said hollow fiber membrane HF and the vapor pressure in the capillary of said hollow fiber membrane is decreased to condense the vapor in the capillary and the condensate is produced. The condensate is sucked out by capillary action of the hollow fiber membrane and permeated through said hollow fiber membrane toward the outside. The outside of the hollow fiber membrane is filled with the dry air.

The function of the humidifier 2 is explained with reference to FIG. 4 and FIG. 5.

The exhaust gas is supplied into the humidifier 2 through the exhaust gas inlet 23a of the distributor 23. The gas is introduced through the inside passage 23a' and reaches the exhaust gas inlet 21din of the hollow fiber membranes module 21. The exhaust gas is diverged at the inlet 21d and passes through the inside of the hollow fiber membranes HF of the hollow fiber membranes bundle 21b. The moisture contained in the exhaust gas is migrated to the dry air passing through the outside of the HF. After having done the moisture exchange with the dry air passing through the outside of the HF, the exhaust gas is discharged from the exhaust gas outlet 21dout. The exhaust gas passed through each of the hollow fiber membrane HF meet and flow together to the exhaust gas outlet 22a through the inside passage 22a'. The exhaust gas is fed toward the gas/liquid separator 3. As aforementioned, the inside passage 23a' of the distributor 23 is communicated to each of the hollow fiber membranes module 21, 21, respectively, thus exhaust gas is divided to each module 21. Function and location of inside passage 22a' of the distributor 22 are the same as the inside passage 23a' and the distributor 23. Thus, the explanation is omitted.

Meanwhile, the dry air is introduced to the humidifier 2 through the dry air inlet 22b of the distributor 22. The dry air reaches dry air inlet 21cin of the hollow fiber membranes module 21 through the inside passage 22b'. The dry air flows outside of the hollow fiber membranes HF passing through inside of the housing 21a. The dry air is supplied with moisture from the exhaust gas to be humidified. The humidified dry air is discharged from the housing 21a through the humidified dry air outlet 21cout. The humidified dry air reaches the humidified dry air outlet 23b through the inside passage 23b' and is fed toward the gas/liquid separator 3 later on. As aforementioned, the inside passage 22b' of the distributor 22 is communicated with each of the two hollow fiber membranes modules 21. The dry air is divided to each of the hollow fiber membranes module. Function and location of the inside passage 23b' is the same as that of the inside passage 22b'. Thus explanation of the same is omitted.

The configuration of the hollow fiber membranes module 21 is so compactly made that treatment is easy. It occupies smaller space. This is one of the characteristics of the present invention.

Next, the preferred embodiments of the heating means to supply heat calorie to the bundle of the water permeable hollow fiber membranes applied to the humidifier according to the present invention applied to automobiles are explained referring with the accompanied drawings.

Figure 6A:
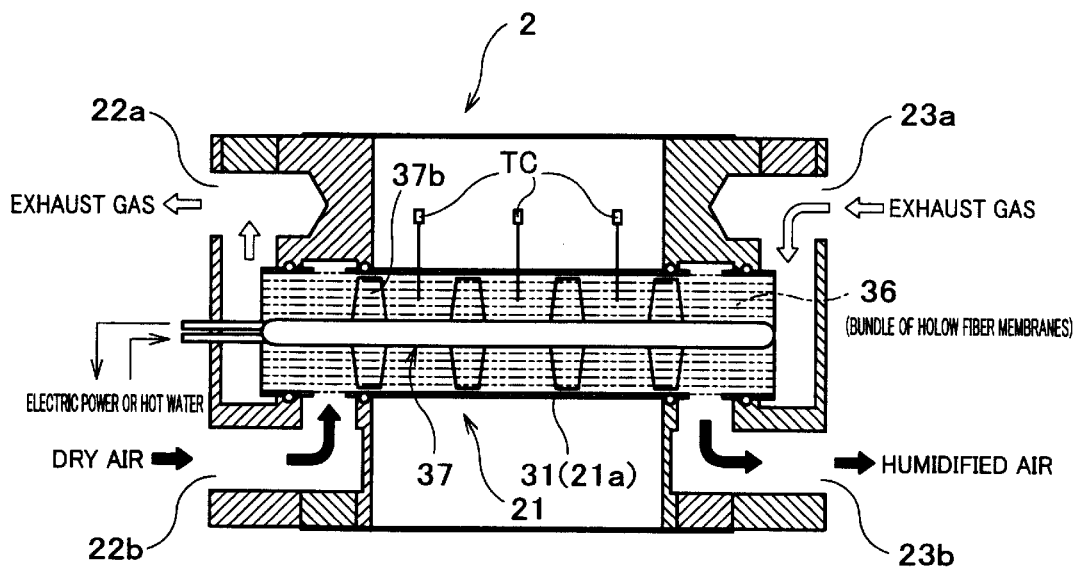
FIG. 6A is a cross section of the heating means to supply heat to the bundle of the water permeable hollow fiber membranes accommodated in the housing of the module of the hollow fiber membranes provided in the humidifier according to the present invention.

The first embodiment of the heating means to supply the heat calorie to the bundle of the hollow fiber membranes comprising a plurality of water permeable hollow fiber membranes contained in the housing 21a of the hollow fiber membranes module 21 of the humidifier 2 is explained in FIG. 6A. The heating means comprises a heater 37 provided a fin 37b embedded in the bundle of the hollow fiber membranes 36 and three thermocouples TC to measure the temperature. The heat calorie is supplied to the bundle of the hollow fiber membranes by observing the temperature indicated by the thermocouple TC.

Figure 6B:
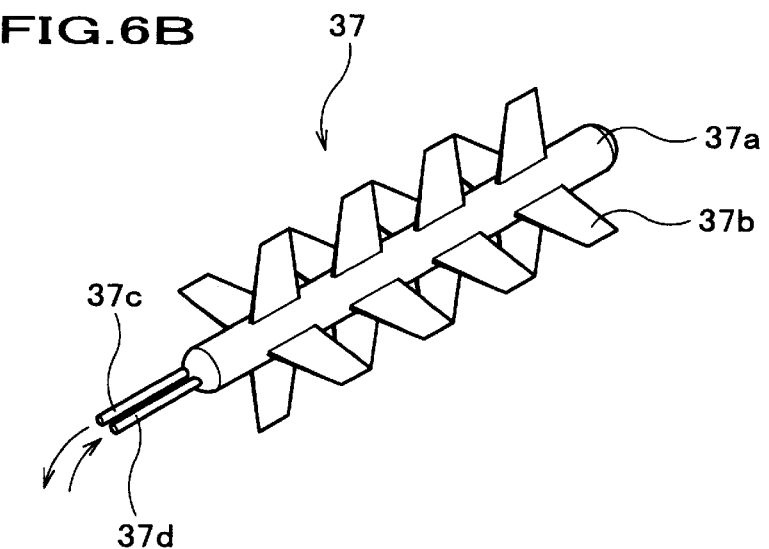
FIG. 6B is an enlarged perspective view of the heater in FIG. 6A.

The heater main body 37a presents a bar-like configuration as shown in FIG. 6B. The four fins 37b are fixedly projected outwardly in radius direction. The configuration of the fin 37b presents a trapezoid. The upper bottom of the trapezoid is located outside. With this fin 37b the heat calorie is effectively transmitted to the hollow fiber membrane from the heater 37a.

There are provided two lead wires 37c, 37d at the end of the heater main body 37a. It is possible to supply electric power from battery or outside power source to the heater 37 through the lead wires 37c, 37d.

FIG. 6B shows an electric heater provided with the fin 37b. It is of course possible to utilize the hot water in place of the electric power. In this case, a hot water supplying tube is used as a heat exchanger with fins in place of the lead wires 37c, 37d. As the hot water, the water used for cooling the fuel cell main body is used. The temperature of the hot water after being used for cooling the fuel cell main body is 80 degrees Celsius.

The three thermocouples TC are provided on the upper part of the housing 31 in its longitudinal direction. Temperature sensor of each thermocouple is located in the center of the hollow fiber membrane to measure the temperature in the center of the module 21c. It is of course recommended to apply four thermocouples TC.

The three thermocouples TC are provided from which temperature at the central part of the module is known. It is observed by the indication of the thermocouple whether the hollow fiber membranes are frozen or defrosted.

The operator can supply heat calorie by means of the heater observing the temperature indicated by the thermocouple. The humidifier is used to defrost the hollow fiber membrane when it is frozen. It is also possible to supply heat calorie to the water permeable hollow fiber membranes when humidifying moisture content in the dry air is decreased by some unknown reasons. The fuel cell is always supplied with stable moisture contents for humidification.

The method to defrost the frozen hollow fiber membrane, watching the temperature indicated by the thermocouple is described in detail later on.

Figure 7:
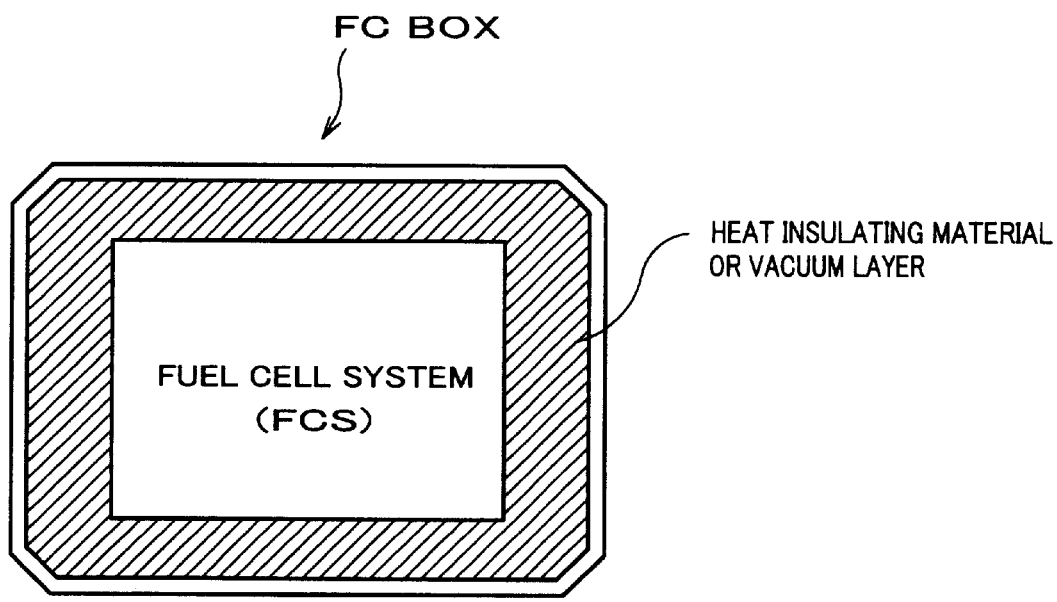
FIG. 7 illustrates the overall composition of a FC box having the heat resistant material or the enclosed vacuum space to keep the fuel cell system warm in the humidifier according to the present invention.

As shown in FIG. 7, the overall composition of the fuel cell system FCS except the fuel evaporator 6 and the reformer 7 are enclosed in a housing. The housing is made of heat insulating material or it has a vacuum layer throughout the whole circumferential wall in order to keep the fuel cell system warm. As a heat insulating material a powder of silica/alumina series material (e.g. perlite) is used. A blanket type heat insulating material is also applied. The degree of vacuum is higher than $1.33 \times 10^{-2}$ Pa which is a little higher than that of the degree of thermos. If a powder insulating material such as perlite or the like is filled in the vacuum layer, the thermal insulation will be much improved.

As aforementioned, the heater provided with fins and the three thermocouples embedded in the bundle of the hollow fiber membranes to supply the necessary heat calorie to the hollow fiber membranes module and the whole fuel cell system except the fuel evaporator and the reformer is enclosed in the housing made of heat insulating material layer or having a vacuum layer throughout the whole circumference of the housing. Thus, warming up of the fuel cell system is much improved. The fuel cell system is swiftly started when it is required.

Figure 8:
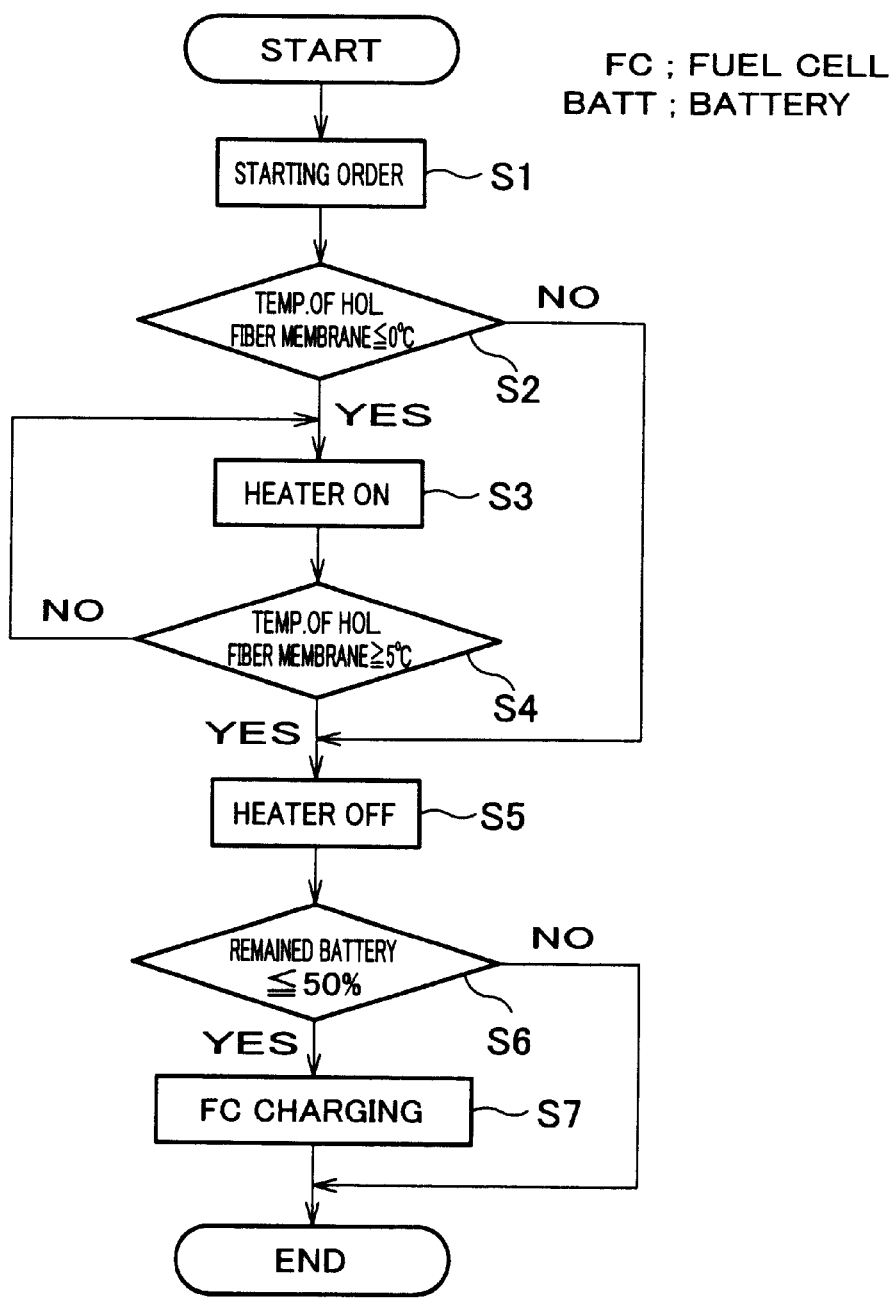
FIG. 8 is a flow chart to defrost the bundle of the frozen hollow fiber membranes when the fuel cell according to the present invention is started.
Figure 9:
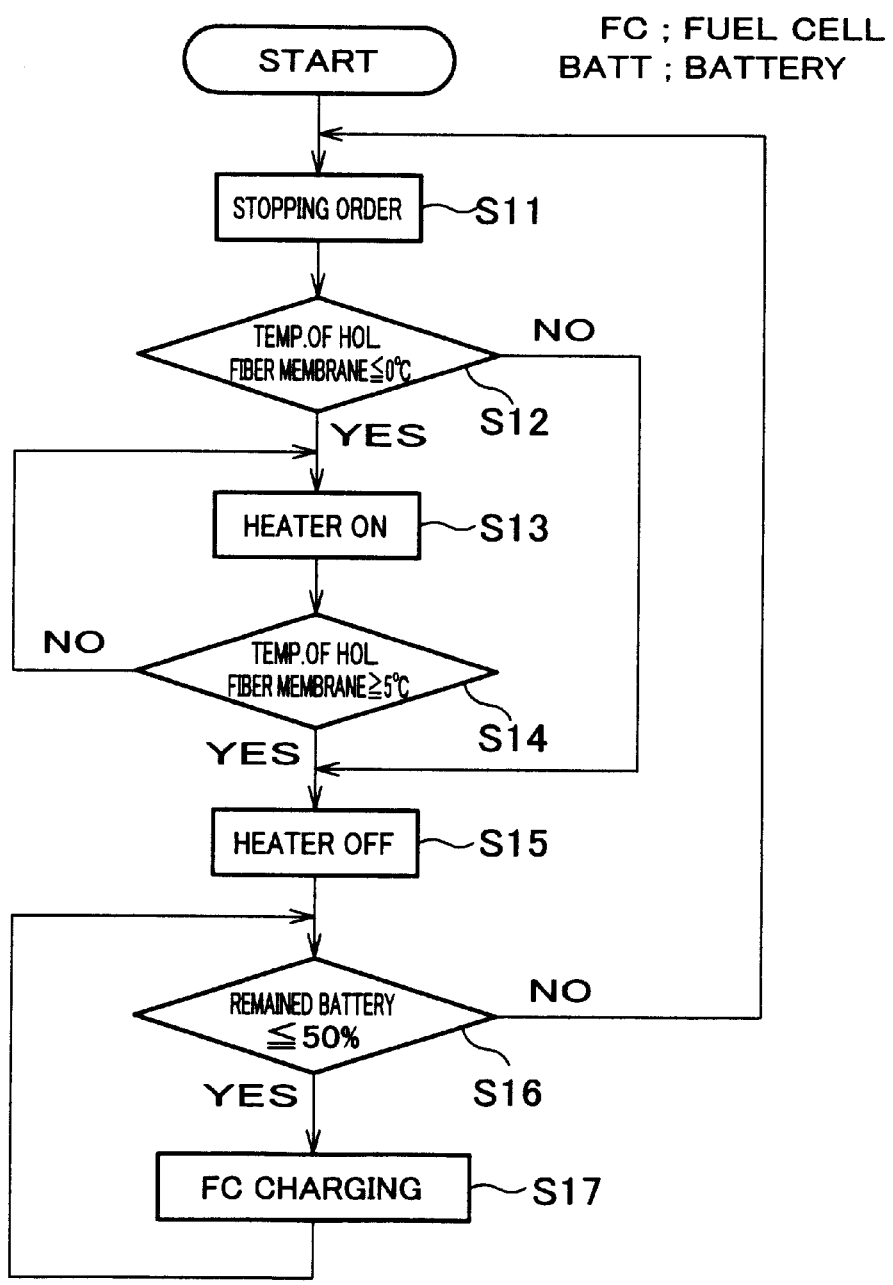
FIG. 9 is a flow chart to illustrate to warm up the bundle of the hollow fiber membranes when the fuel cell equipped with the humidifier according top the present invention is stopped.
Figure 10:
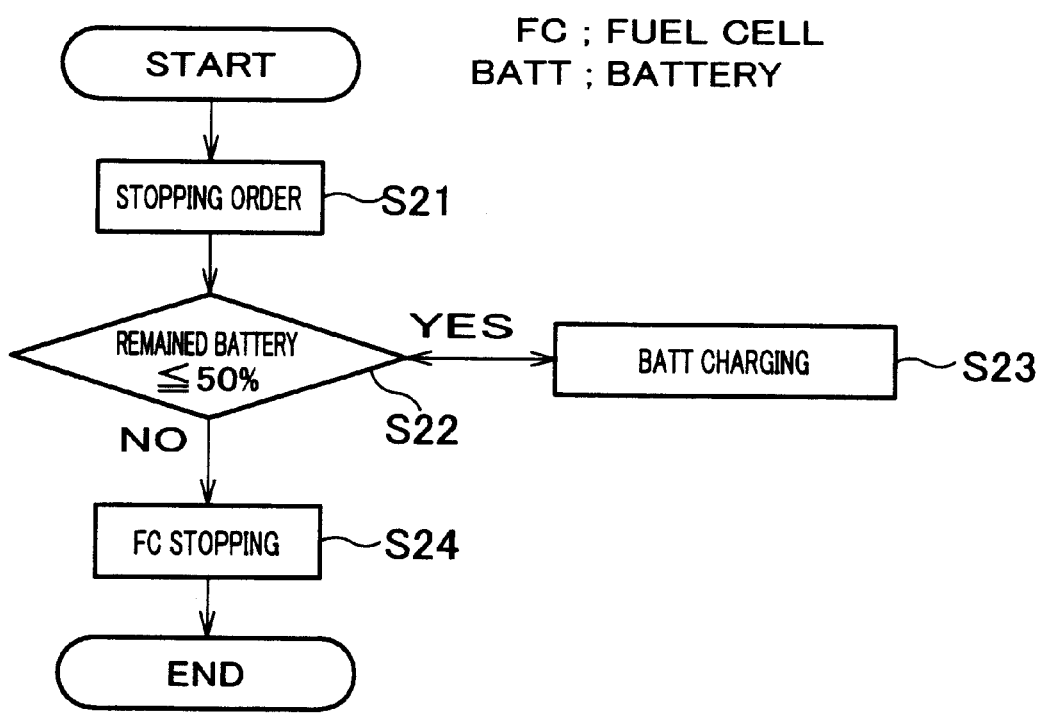
FIG. 10 is a flow chart to illustrate to secure the remained battery amounts in the storage battery when the fuel cell according to the present invention is stopped.

Next, defrosting method by means of the heater is described. When the bundle of the hollow fiber membranes applied in the humidifier is frozen the power source battery must be kept safe. The frozen bundle of the hollow fiber membranes is defrosted by means of the heater. The method is illustrated with reference to FIGS. 8, 9 and 10.

Firstly, prior to starting fuel cell the power source battery is kept safe. The power source battery operates the heater to defrost the frozen bundle of the hollow fiber membranes. The method is explained with reference to FIG. 8.

[Explanation of Defrosting Flow Chart when the Fuel Cell is Started]

1. Issue the starting order to start the fuel cell (S1).
2. Judge the temperature of the bundle of the hollow fiber membranes 36 in the hollow fiber membranes module 21 is below 0 degrees Celsius or not by watching the temperature indicated by the three thermocouples TC (S2).

When the temperature of the bundle of the hollow fiber membranes 36 is indicated below 0 degrees Celsius, the heater 37 is started (S3). Meanwhile, if the temperature goes up 0 degrees Celsius, treat as follows:
    A) Stop the heater 37 (S5).
    B) Judge the remained battery is less than 50% or over (S6).
    C) If the remained battery is less than 50%, start the fuel cell to charge the battery (S7).
    D) If the remained battery is over 50%, finish the defrosting work.

2. After the heater 37 is started (S3), judge the temperature of the bundle of the hollow fiber membranes 36 is over 5 degrees Celsius or not (S4).

If the temperature of the bundle of the hollow fiber membranes 36 is over 5 degrees Celsius, stop the heater 37 (S5). Meanwhile, if the temperature of the bundle of the hollow fiber membranes 36 is less than 5 degrees Celsius, continue the operation of the heater 37 until the temperature of the bundle of the hollow fiber membranes 36 goes up over 5 degrees Celsius (S3).

3. After stopping the heater (S5), judge the remained battery whether it is 50% over or less (S6).

If the remained battery is less than 50%, start the fuel cell to charge the battery (S7). Meanwhile, if the remained battery is over 50%, finish the defrosting work.

Like that, prior to starting the fuel cell, the heater is operated by means of the power source battery already charged over 50% and when the defrosting work is finished and the heater is stopped the operator should check the remained battery. If the remained battery is less than 50% the fuel cell is started to charge the battery. If the remained battery is over 50% the fuel cell is stopped. The power source battery is secured and the bundle of the frozen hollow fiber membranes is defrosted at any time. Accordingly, the humidifier is utilized in colder environments.

In a conventional system, if the battery should become over-discharged while operating the heater, the fuel cell system stops working. However, the construction of the present invention does not stop the operation. The battery works continuously. This is described later on.

After the fuel cell being stopped, the power source battery, observing the temperature of the, bundle of the hollow fiber membranes, operates the fuel cell. The defrosting method to warm up the fuel cell so that the bundle of the water permeable hollow fiber membranes may not be frozen is explained with reference to FIG. 9.

[Explanation of the Flow Chart Awaiting Warm-up the Humidifier when the Fuel Cell is Stopped]

1. Stop the fuel cell (S1).
2. Judge the temperature of the bundle of the hollow fiber membranes 36 is below 0 degrees Celsius observing the temperature indicated by the three thermocouples TC (S12).

If the temperature indicates below 0 degrees Celsius, start the heater 36 (S13).

Meanwhile, if the temperature is over 0 degrees Celsius, treat as follows:

E) Stop the heater 37 (S15).
    F) Judge the remaining charge in the battery if it is less than 50% or not (S16).
    G) If the remaining charge in the battery is less than 50%, start the fuel cell to charge the battery (S17).
    H) Meanwhile, if the remaining charge in the battery is over 50%, stop the fuel cell (S11).

3. After the heater 37 being started (S13), judge the temperature of the bundle of the hollow fiber membranes 36 goes up over 5 degrees Celsius or not (S14).

If the temperature is over 5 degrees Celsius, stop the heater (S15). If the temperature is less than 5 degrees Celsius, continue the operation of the heater 37 until the temperature goes up over 5 degrees Celsius (S13).

4. After the heater being stopped (S15), again judge if the remaining charge in the battery is less than 50% or not (S16).

If the remaining charge in the battery is less than 50%, start the fuel cell 1 to charge the battery until it goes over 50% (S17). Meanwhile, if the remaining charge in the battery goes up over 50%, stop the fuel cell (return to S11).

After the fuel cell is stopped, operate the heater with the power source battery already charged over 50%. If the heater is stopped, the operator must check the charge remained in the battery to see if it is still in the operable condition. As starting the fuel cell so that the charge remained in the battery may be prevented from going down less than 50%, the power source of the heater is always secured. The bundle of the frozen hollow fiber membranes is defrosted at any time. Accordingly, the humidifier is used in colder environments.

After the fuel cell being stopped, the power source battery, observing the temperature of the bundle of the hollow fiber membranes, operates the fuel cell. The defrosting method to warm up the fuel cell so that the bundle of the water permeable hollow fiber membranes may not be frozen is explained with reference to FIG. 10.

[Explanation of the Flow Chart to Secure the Remained Battery when the Fuel Cell is Stopped]

1. Issue the stopping order to stop the fuel cell (S21).
2. Judge the charge remaining in the battery is less than 50% or over (S22). If the charge remaining in the battery is less than 50%, charge the battery (S23).

If the charge remaining in the battery goes over 50%, stop the fuel cell. (S24).

3. When the fuel cell is stopped, the work for securing the charge remaining in the battery to defrost the bundle of the hollow fiber membranes 36 is finished.

Prior to stopping the fuel cell, the charge remaining in the battery is checked if it is less than or over 50%. If the charge remaining in the battery is less than 50%, the battery is charged. The battery is stopped when the remained battery goes over 50%. The charge remaining in the battery of over 50% is always secured even if the fuel cell is stopped. Consequently, the power source for the heater is secured even after the fuel cell being stopped. Sufficient battery amount is secured. The battery can work continuously when the fuel cell is started or during waiting for warming up.

As explained above, the power source is secured according to the operating condition of the fuel cell as described in the first preferred embodiment of the invention. The heater is operated while observing the temperature of the bundle of the hollow fiber membranes and the charge remained in the battery, the bundle of the hollow fiber membranes is defrosted or prevented from being frozen at anytime and anywhere.

Figure 11A:
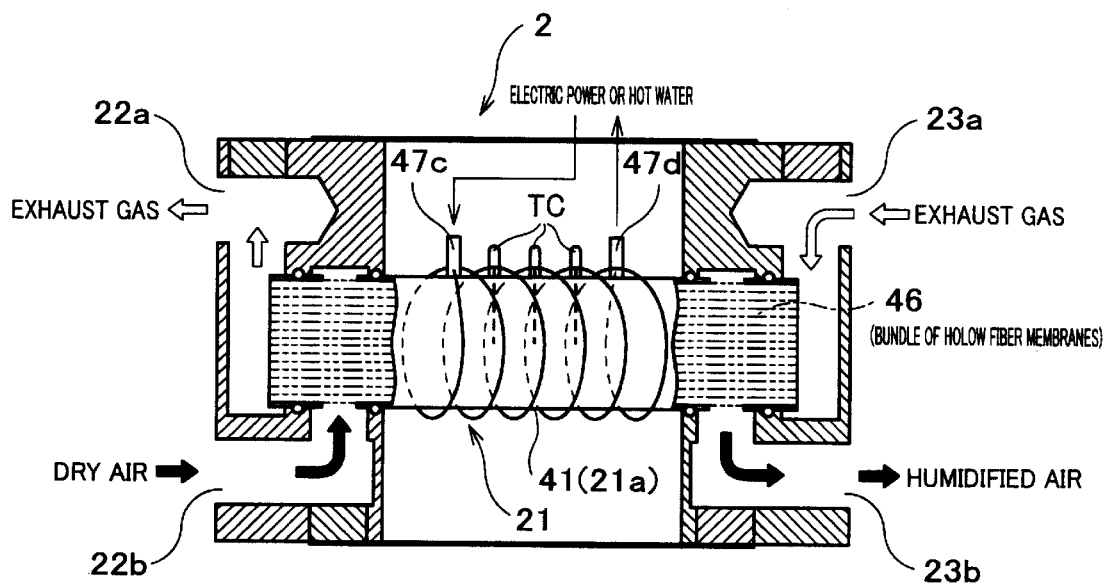
FIG. 11A is a cross section of the heating means to supply the heat to the bundle of water permeable hollow fiber membranes accommodated in the housing of the module equipped with the humidifier according to the present invention.

The second embodiment of the present invention is explained. The heating means can supply the heat calorie to bundle of the water permeable hollow fiber membranes accommodated in the housing 21a of the humidifier. As shown in FIG. 11A, the heating means comprises the three thermocouples to measure the temperature of the bundle of the hollow fiber membranes and a heater 47 surrounding the outside of a housing 41. The heater 47 can supply the necessary heat calorie to the whole of the bundle of the hollow fiber membranes 46 from the outside of the housing 41.

Figure 11B:
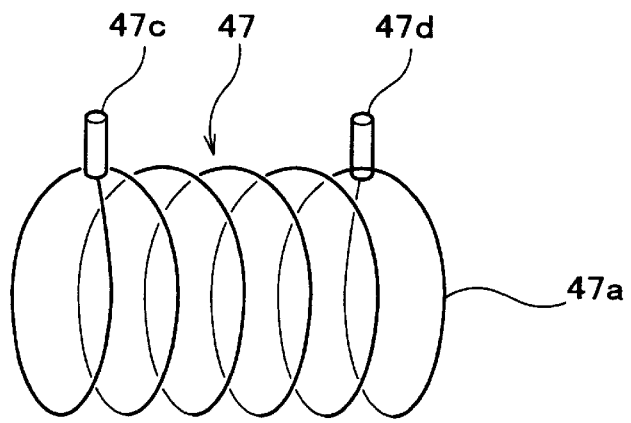
FIG. 11B is an expanded view of the heater in FIG. 11A.

The heater main body 47a is a flexible heater. The flexible heater is used for rolling the circumference of the housing 41 spirally. Both ends of the flexible heater are provided with connecting terminals 47c, 47d. FIG. 11B shows the heater. The heater can use hot water as a heating source.

The heater main body 47a functions as a heat exchanger of spiral coil type and hot water supply tubes are applied in place of the lead wires 47c, 47d. As the cooling water the water used for cooling the fuel cell main body is again applied for cooling the heater. This water is 80 degrees Celsius.

The three thermocouples TC are provided on the upper part of the housing 41 in its longitudinal direction. As shown in FIG. 11A, the three thermocouples are provided with a preferable distance. Temperature sensor of each thermocouple is located in the center of the hollow fiber membrane to measure the temperature in the center of the module 21. It is of course recommended to apply four thermocouples TC.

The three thermocouples TC indicate the temperature at the central part of the module. The operator can watch the indication of the thermocouple to note if the bundle of the hollow fiber membranes is frozen or defrosted.

As shown in FIG. 7, the overall composition of the fuel cell system FCS except the fuel evaporator 6 and reformer 7 are enclosed in the housing. The housing is made of heat insulating material or it has a vacuum layer throughout the whole circumstance wall in order to keep the fuel cell system warm. As a heat insulating material a powder of silica/ alumina series materials (e.g. perlite) is used. A blanket type heat insulating material is also applied. The degree of vacuum is about 1.33×10-2 P or the like is preferable.

Figure 12:
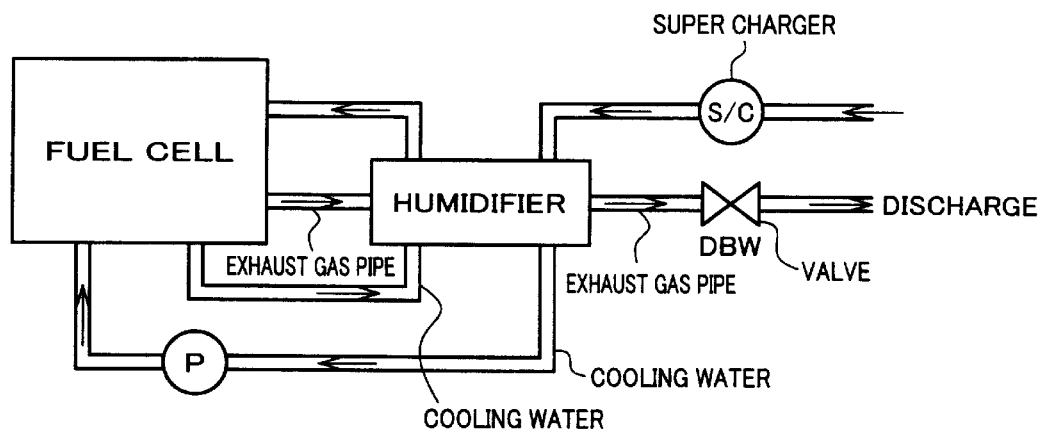
FIG. 12 indicates the overall combination of the fuel cell and the humidifier according to the present invention and outline of piping arrangement thereof.

Some improvements have been made to effectively utilize the heating means. In the humidifier for the fuel cell disclosed in the claim 2, the heating means comprises utilizing the cooling water used for the cooling the fuel cell, wherein the cooling water is again used for flowing on the outside circumference of the humidifier to heat the exhaust gas which is supplied into the humidifier. (FIG. 12)

The cooling water is heated by cooling,the fuel cell and said heated cooling water is flowed along the outside of the humidifier. The humidifier is heated to control the temperature of the exhaust gas to be controlled. Moisture migration is made certainly and effectively. Electric generation efficiency is maintained securely.

Figure 13:
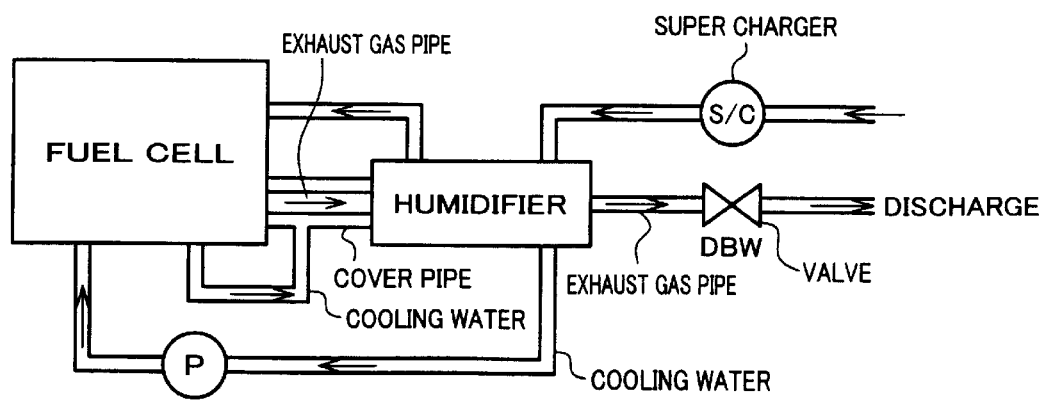
FIG. 13 indicates another example of the overall combination of the fuel cell and the humidifier according to the present invention and outline of piping arrangement thereof.

In the humidifier for the fuel cell disclosed in claim 2, wherein the heating means comprises contacting the cooling water used for cooling the fuel cell is flowed along the piping tube leading the exhaust gas to the humidifier to heat the exhaust gas to be supplied into the humidifier. (FIG. 13).

The cooling water is heated by cooling the fuel cell and said heated cooling water is flowed contacting and along the piping tube for leading the exhaust gas to the humidifier. The exhaust gas is heated to control the temperature of the exhaust gas to be decreased. Moisture migration is made certainly and effectively. Electric generation efficiency of the fuel cell is maintained securely.

Further, it is preferable to place a heating element along the exhaust gas pipe between the humidifier and the fuel cell system FCS to heat the exhaust gas. This embodiment indicates an example to supply oxidant gas at cathode side of the fuel cell. It is of course preferable to place a heating element at anode side of the fuel cell to heat the exhaust gas.

Figure 14:
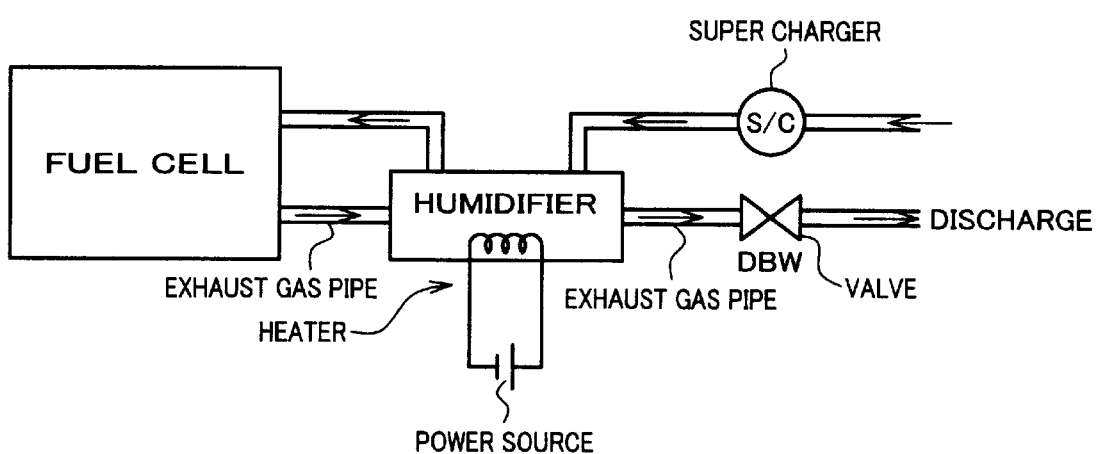
FIG. 14 indicates another example of the overall combination of the fuel cell and the humidifier according to the present invention and outline of piping arrangement thereof.

In the humidifier for the fuel cell disclosed in claim 2, wherein the heating means comprises a flexible heater to be heated by electric power. The flexible heater is wound around outside of the circumference of the humidifier. The exhaust gas is heated when the heat generated by the flexible heater is supplied into the humidifier. (FIG. 14)

The water is heated by the heat generated from the flexible heater wound around the outside circumference of the humidifier. The humidifier is easily heated to control the temperature of the exhaust gas to be decreased. Moisture migration is made certainly and effectively. Electric generation efficiency is maintained securely.

As aforementioned, warm-up efficiency of the fuel cell system is increased. It is possible to start the fuel cell system swiftly when it is required.

The operator can supply the heating calorie by means of the heater observing the temperature indicated with the thermocouple. The humidifier can be used because the heater defrosts the frozen hollow fiber membranes. In case the moisture content in the dry air is decreased by unknown reasons the water permeable hollow fiber membrane is supplied with the heating calorie to add moisture content. The sufficient amount of moisture to be humidified is added to the fuel cell.

The method to defrost the frozen bundle of the hollow fiber membrane 46 by the heater 47 watching the temperature of the thermocouple TC and remained battery is the same as that of the first embodiment of the invention. Thus, the explanation is omitted.

While the invention has been described in detail and with reference to specific embodiments thereof, it will be apparent to one skilled in the art that various changes and modifications can be made therein without departing from the spirit and scope thereof.

For example, dry air or humidified air may flow outside of the hollow fiber membrane, while the dry air passes through inside of the hollow fiber membrane. Furthermore, the Water permeable membrane is not limited to a hollow fiber membrane, it may be in the form of a repeatedly folded film-like water permeable membrane or in the form of a winded roll.

The dry air (humidified air) and the exhaust gas may flow through the hollow fiber membrane module in a counter-flow fashion. The dry air and the exhaust gas may flow in parallel.

Counter-flowing the dry air and the exhaust gas is advantageous because the humidity concentration difference within the hollow fiber membranes can be equalized and thus the water permeability thereof can be improved. Further, opposing layout of the gas inlet and the gas outlet facilitates arrangement of the gas piping. Further, because heat exchanger effectiveness through the hollow fiber membrane is improved, cooling performance of the gas is improved. Furthermore, because of the higher heat exchanger effectiveness, the outlet temperature of the dry air is easily adjustable to the outlet temperature of the exhaust gas, and thereby the temperature adjustment is facilitated. This facilitates management of the humidity of the air supplied to the fuel cell.

Meanwhile, parallel-flowing the dry air and the exhaust gas is advantageous because the humidity concentration difference at the inlet is higher and the humidifying capability is improved, the overall length of the hollow fiber membrane per se can be reduced, which leads to reduced size of the device. Further, because the size of the device is reduced, the hollow fiber membranes are easily bundled in line, leading to reduced cost. Furthermore, because heat exchanger effectiveness of the dry air is lower, the temperature of the gas supplied to the fuel cell can be set higher when the output of the fuel cell is higher. Therefore, effectiveness of the fuel cell can be improved.

Temperature adjustment function of the humidifier will be described additionally.

For example, the dry air compressed by an air compressor such as a supercharger changes its temperature in the range of approximately from 30 degrees Celsius (when idling the fuel cell) to 120 degrees Celsius (at the maximum output of the fuel cell). Meanwhile, the fuel cell is operated at a temperature of approximately 80 degrees Celsius under control of the temperature, and the exhaust gas is discharged at a temperature of 80 degrees Celsius and a little more. When flowing this exhaust gas and the dry air compressed by the air compressor into the humidifier, thermal transfer as well as moisture transfer occurs through the hollow fiber membrane. As a result, the dry air is supplied to the fuel cell as a humidified air having a temperature close to the exhaust gas that is a stable temperature close to the operating temperature of the fuel cell. In other words, when the output of the fuel cell is lower, such as in the idling-time, the dry air is humidified and heated through the humidifier and is supplied to the fuel cell, however, when the output of the fuel cell is, higher, such as in the maximum output of the fuel cell, the dry air is humidified and cooled through the humidifier and is supplied to the fuel cell as a humidified air within a stable temperature range. Therefore, with the temperature adjustment function of the humidifier, the fuel cell is operated under appropriate temperatures, leading to increased generation efficiency.

Further, when an inter-cooler is mounted at an exhaust side of the air compressor, the dry air compressed by the air compressor is cooled or heated, and changes its temperature in the range of approximately from 50 degrees Celsius (when idling the fuel cell) to 60 degrees Celsius (at maximum output of the fuel cell). If the dry air passing through the inter-cooler is flown through the humidifier, where the exhaust gas (having a temperature of 80 degrees Celsius and a little more) flows, the dry air is humidified and heat-adjusted (heated) through the hollow fiber membrane and is supplied to the fuel cell as a humidified air having a temperature close to the exhaust gas that is a stable temperature close to the operating temperature of the fuel cell. Therefore, even if an inter-cooler is mounted, with the temperature adjustment function of the humidifier, the fuel cell is operated under appropriate temperatures, leading to increased electric generation efficiency.

Effect of the Invention

As it is apparent from the aforementioned composition and function of the present invention, the humidifier provided various heating means to supply necessary heat calorie to the bundle of the hollow fiber membrane is prepared according to the present invention. The humidifier is used in the colder territory even if the hollow fiber membrane is frozen.

What is claimed is:

1. A humidifier for a fuel cell system comprising:

a housing;

a plurality of bundles of water permeable hollow fiber membranes provided in the housing, each of the bundles having a large number of the water permeable hollow fiber membranes arranged along the longitudinal direction of the housing, wherein
two different gasses containing different water contents are supplied, one of the two different gasses containing large water contents being passed through an inside the water permeable hollow fiber membranes, while the other gas containing lesser water contents being passed through an outside of the water permeable hollow fiber membranes, respectively, to exchange water contents to humidify the gas containing lesser water contents; and
a heating means that is embedded in the bundles of the water permeable hollow fiber membranes and has a plurality of fins to supply heat calorie to the bundles of the hollow fiber membranes.

2. A humidifier for a fuel cell system comprising:

a housing;

a plurality of bundles of water permeable hollow fiber membranes provided in the housing, each of the bundles having a large number of the water permeable hollow fiber membranes arranged along the longitudinal direction of the housing, wherein
two different gasses containing different water contents are supplied, one of the two different gasses containing large water contents being passed through an inside the water permeable hollow fiber membranes, while the other gas containing lesser water contents being passed through an outside of the water permeable hollow fiber membranes, respectively, to exchange water contents to humidify the gas containing lesser water contents; and
a heating means utilizing cooling water heated by cooling a fuel cell of the fuel cell system to supply heat calorie to the bundles of the hollow fiber membranes, said cooling water being supplied along an outer circumference of said humidifier to maintain temperature of an exhaust gas discharged from the fuel cell and introduced to said humidifier substantially at a temperature of the fuel cell in operation.

3. A humidifier for a fuel cell system comprising:

a housing;

a plurality of bundles of water permeable hollow fiber membranes provided in the housing, each of the bundles having a large number of the water permeable hollow fiber membranes arranged along the longitudinal direction of the housing, wherein
two different gasses containing different water contents are supplied, one of the two different gasses containing large water contents being passed through an inside the water permeable hollow fiber membranes, while the other gas containing lesser water contents being passed through an outside of the water permeable hollow fiber membranes, respectively, to exchange water contents to humidify the gas containing lesser water contents; and
a heating means that supplies heat calorie to the bundles of the hollow fiber membranes,
wherein the heating means contacts piping tubes leading an exhaust gas discharged from a fuel cell of the fuel cell system to said humidifier to heat the exhaust gas introduced to said humidifier, said heating means being located between the fuel cell and the humidifier, and being placed at an anode side of the fuel cell to heat the exhaust gas.

4. A humidifier for a fuel cell system comprising:

a housing;

a plurality of bundles of water permeable hollow fiber membranes provided in the housing, each of the bundles having a large number of the water permeable hollow fiber membranes arranged along the longitudinal direction of the housing, wherein
two different gasses containing different water contents are supplied, one of the two different gasses containing large water contents being passed through an inside the water permeable hollow fiber membranes, while the other gas containing lesser water contents being passed through an outside of the water permeable hollow fiber membranes, respectively, to exchange water contents to humidify the gas containing lesser water contents; and
a heating means that supplies heat calorie to the bundles of the hollow fiber membranes,
wherein the heating means contacts piping tubes leading an exhaust gas discharged from a fuel cell of the fuel cell system to said humidifier to heat the exhaust gas introduced to said humidifier, said heating means being located between the fuel cell and the humidifier, and being placed at a cathode side of the fuel cell to heat the exhaust gas.

5. A humidifier for a fuel cell system comprising:

a housing;

a plurality of bundles of water permeable hollow fiber membranes provided in the housing, each of the bundles having a large number of the water permeable hollow fiber membranes arranged along a longitudinal direction of the housing, wherein two different gases containing different water contents are supplied, one of the two different gases containing large water contents being passed through an inside the water permeable hollow fiber membranes, while the other gas containing lesser water contents being passed through an outside of the water permeable hollow fiber membranes, respectively, to exchange water contents to humidify the gas containing lesser water contents; and a temperature adjustment means that utilizes cooling water heated by cooling a fuel cell of the fuel cell system to heat and cool one of an exhaust gas discharged from the fuel cell and introduced to said humidifier and the bundles of the hollow fiber membranes so as to maintain temperature thereof substantially at a temperature of the fuel cell in operation.

* * * * *